US012391038B2

(12) United States Patent
Negishi et al.

(10) Patent No.: US 12,391,038 B2
(45) Date of Patent: Aug. 19, 2025

(54) PRINTING APPARATUS, CONTROL METHOD THEREOF, AND RECORDING MEDIUM

(71) Applicant: CANON KABUSHIKI KAISHA, Tokyo (JP)

(72) Inventors: Masashi Negishi, Kanagawa (JP); Yusuke Kiyokawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 18/322,872

(22) Filed: May 24, 2023

(65) Prior Publication Data

US 2023/0391076 A1 Dec. 7, 2023

(30) Foreign Application Priority Data

Jun. 7, 2022 (JP) ................................ 2022-092336

(51) Int. Cl.
*B41J 2/045* (2006.01)
*B41J 2/14* (2006.01)

(52) U.S. Cl.
CPC ....... *B41J 2/04573* (2013.01); *B41J 2/14201* (2013.01)

(58) Field of Classification Search
CPC ... B41J 2/04573; B41J 2/14201; B41J 2/2142
See application file for complete search history.

(56) References Cited

U.S. PATENT DOCUMENTS 6,357,849 B2 3/2002 Takizawa
8,651,622 B2 2/2014 Oikawa
9,676,182 B2 6/2017 Kiyokawa
2002/0018090 A1 2/2002 Takazawa
2004/0095410 A1 5/2004 Miyashita
2014/0375718 A1* 12/2014 Govyadinov .......... B41J 2/0451 347/14
2022/0016889 A1 1/2022 Kiyokawa

FOREIGN PATENT DOCUMENTS

JP 2004-042281 A 2/2004
JP 2005035309 A * 2/2005 .............. B41J 2/115

(Continued)

OTHER PUBLICATIONS

Endo Hironori et al., "Method for Detecting Nonoperating Nozzle While Moving Print Head and Inspection Section Relatively" (JP 2005035309 A), Feb. 10, 2005, Abstract, Tech Solution, and First Embodiment (Year: 2005).*

(Continued)

*Primary Examiner* — Lisa Solomon
(74) *Attorney, Agent, or Firm* — Venable LLP

(57) ABSTRACT

An embodiment of the present invention is a printing apparatus including: a print head including a plurality of nozzles configured to eject droplets onto a print medium; a control unit configured to control driving of each of the plurality of nozzles to eject the droplets; and an inspection unit configured to inspect whether or not each of the plurality of nozzles is able to eject the droplets normally by driving the print head by the control unit, wherein in a case where the inspection unit inspects one target nozzle among the plurality of nozzles, the control unit drives the target nozzle and one or more neighboring nozzles arranged near the target nozzle.

19 Claims, 9 Drawing Sheets

(56) References Cited

FOREIGN PATENT DOCUMENTS

| | | | |
|---|---|---|---|
| JP | 2005-161616 | A | 6/2005 |
| JP | 2007-152853 | A | 6/2007 |

OTHER PUBLICATIONS

Oct. 17, 2023 European Search Report in European Patent Appln. No. 23176602.3.

Feb. 16, 2024 European Official Action in European Patent Appln. No. 23176602.3.

* cited by examiner

PRINTING APPARATUS, CONTROL METHOD THEREOF, AND RECORDING MEDIUM

BACKGROUND

Field

The present disclosure relates to an inkjet printing apparatus, and more particularly to a technique for detecting an ejection state of an ink droplet ejected from a print head.

Description of the Related Art

In an inkjet printing apparatus, it is important to know ejection states of ink droplets ejected from nozzles of a print head on a nozzle-by-nozzle basis in order to keep the quality of a printed image at a certain level. In recent years, there have been demands for higher image quality and higher speed as well as adaptation to the diversification of mounted inks, and the size of ink droplets ejected from each nozzle has been becoming smaller. In particular, due to variations among print heads and differences in the physical properties among ink colors, an ejection velocity and a droplet volume of ink droplets to be ejected for each ink color are set to the most suitable values from the viewpoint of image formation. However, it has been known that the ejection states of ink droplets ejected vary depending on the use conditions of the printing apparatus and environmental influence thereon. It has been also found that ejected ink droplets (a main droplet and satellite droplets which are microdroplets split from the main droplet) vary in physical properties such as ejection velocity (flight velocity), size, flight interval, and ejection direction also vary. For this reason, before use of a printing apparatus, it is desirable to detect the ejection states of ejected ink droplets and determine whether ink droplets can be ejected or not and whether the ejection velocity is normal.

U.S. Patent Laid-Open No. 2004/0095410 discloses a technique in the related art for detecting non-ejection of droplets. In U.S. Patent Laid-Open No. 2004/0095410, a pair of a light emitting element and a light receiving element are used and an ink droplet is ejected so as to pass through a light beam emitted from the light-emitting element and reach the light receiving element, and non-ejection of the droplet is determined if a drop in the amount of light received by the light-receiving element is not detected. There has been proposed a method using such an optical detector and including: performing processing of ejecting ink droplets at intervals between which a predetermined number of ink droplets can pass through an emitted light beam; and statistically evaluating the obtained data on the ink droplets.

Japanese Patent Laid-Open No. 2007-152853 discloses another technique in the related art. Japanese Patent Laid-Open No. 2007-152853 proposes a method using an optical detector and including determining non-ejection of ink droplets and measuring an ejection velocity of the ink droplets. As a method of measuring the ejection velocity, a time period required by the ink droplet to reach a light beam emitted from the optical detector from an output time of an ejection signal is measured, and the ejection velocity is calculated based on the measured result and the distance from the print head to the light beam.

SUMMARY

However, in an inkjet printing apparatus, if the ejection velocity of the ink droplets ejected from the print head is low, the ink droplets tend to achieve a short flight distance and have an unstable flight state. For this reason, in the optical detector that detects the ejection state of an ink droplet, the behavior of an ink droplet ejected to the emitted light beam is sometimes so unstable that the ink droplet may not reach a predetermined detection area by flying at a desired velocity. As a result, there is a problem that the detection accuracy of the ejection state deteriorates, which makes it impossible to accurately determine non-ejection and measure the ejection velocity.

The foregoing patent literatures, in particular, are on the premise that a droplet stably reaches a detection area. For this reason, if the ejection velocity of droplets is low, the detection accuracy cannot be maintained and non-ejection may be erroneously determined.

In view of the above problem, the present disclosure has an object to maintain the detection accuracy of the ejection states of droplets such as ink droplets and prevent erroneous determination.

An embodiment of the present invention is a printing apparatus including: a print head including a plurality of nozzles configured to eject droplets onto a print medium; a control unit configured to control driving of each of the plurality of nozzles to eject the droplets; and an inspection unit configured to inspect whether or not each of the plurality of nozzles is able to eject the droplets normally by driving the print head by the control unit, wherein in a case where the inspection unit inspects one target nozzle among the plurality of nozzles, the control unit drives the target nozzle and one or more neighboring nozzles arranged near the target nozzle.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings.

First Embodiment

<General Overview of Printing Apparatus>

Figure 1:
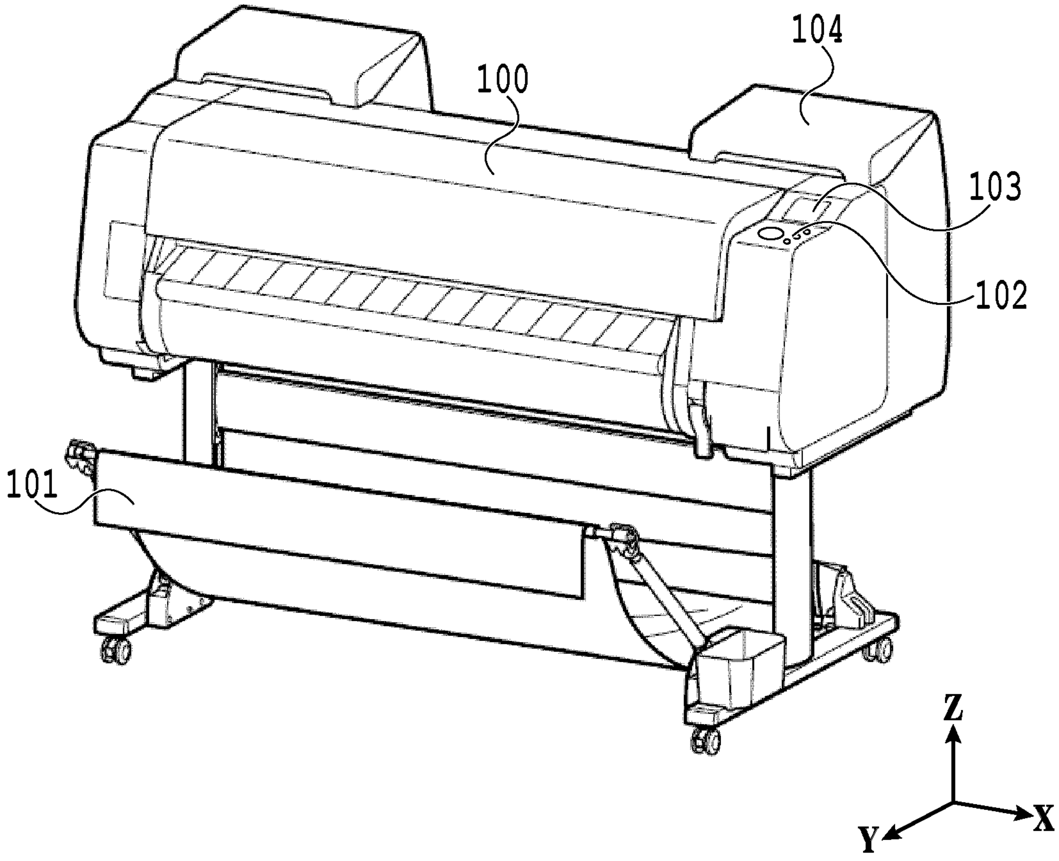
FIG. 1 is an appearance of a printing apparatus.

FIG. 1 is a diagram illustrating an appearance of an inkjet printing apparatus (hereinafter referred to as the printing apparatus) 100 as an example of a droplet ejection apparatus according to the present embodiment.

The printing apparatus 100 includes a paper delivery guide 101 configured to stack output print media, an operation button 102 configured to enable settings of a printing mode and a print sheet, and a display panel 103 configured to display various kinds of printing information and setting results. The printing apparatus 100 includes an ink tank unit 104 configured to house ink tanks storing color inks such as black, cyan, magenta, and yellow inks, and supply the inks to a print head 201 (FIG. 2) as an example of an droplet ejection head. The printing apparatus 100 illustrated in FIG. 1 is a printing apparatus capable of printing on print media with various widths up to print media in 60-inch size. As a print medium for print by the printing apparatus 100, roll paper or cut paper may be used. The print media are not limited to paper, but may be, for example, cloth or vinyl.

Figure 2:
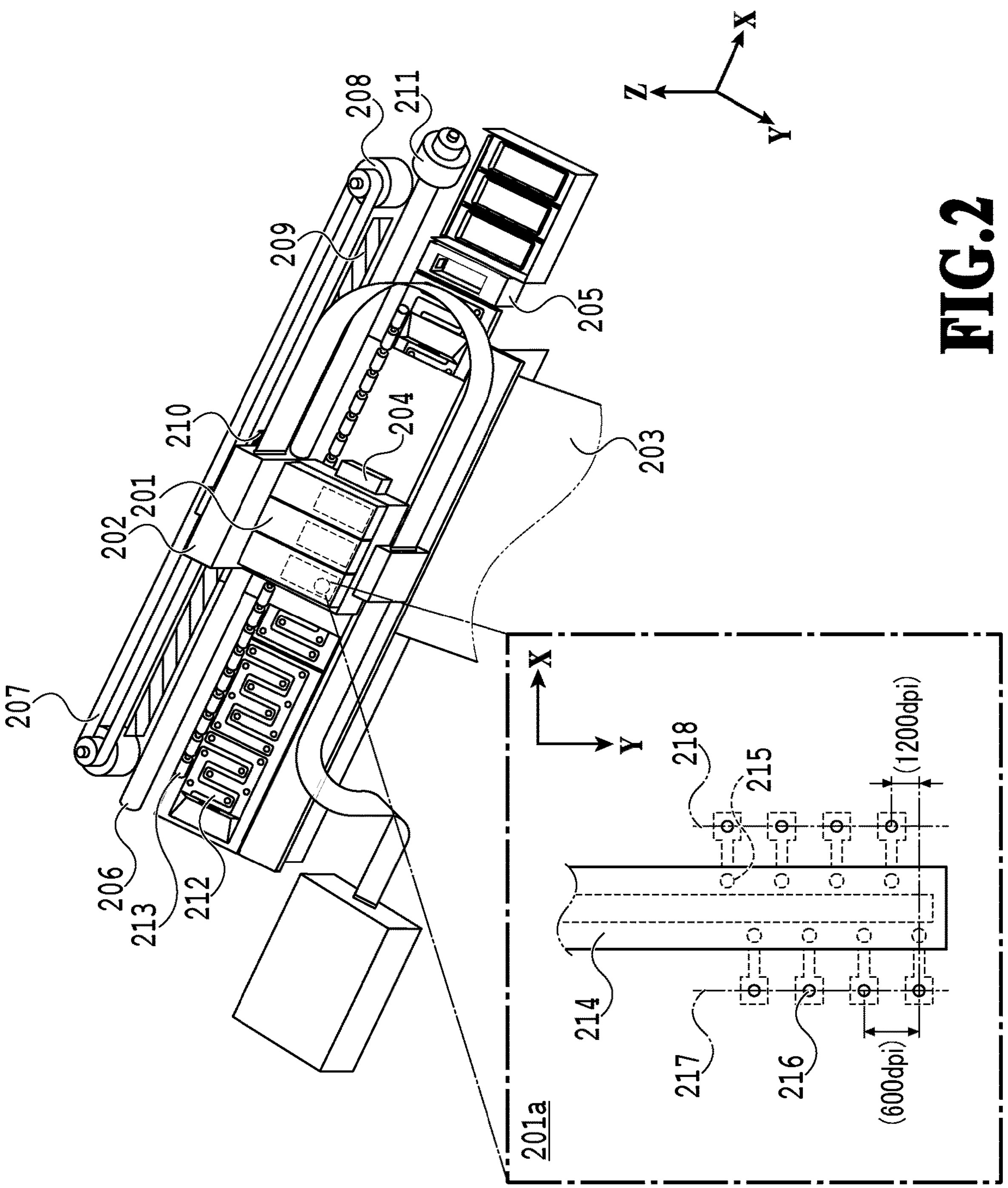
FIG. 2 is a perspective view illustrating an internal structure of the printing apparatus.

FIG. 2 is a perspective view illustrating an internal structure of the printing apparatus 100. A platen 212 is a member placed at a position opposed to the print head 201 and configured to support a print medium 203 transported to that position. The print medium 203 is transported in a transport direction (Y direction) by a paper transport roller 213 while being supported by the platen 212. The print head 201 is mounted on a carriage 202.

Figure 4A:
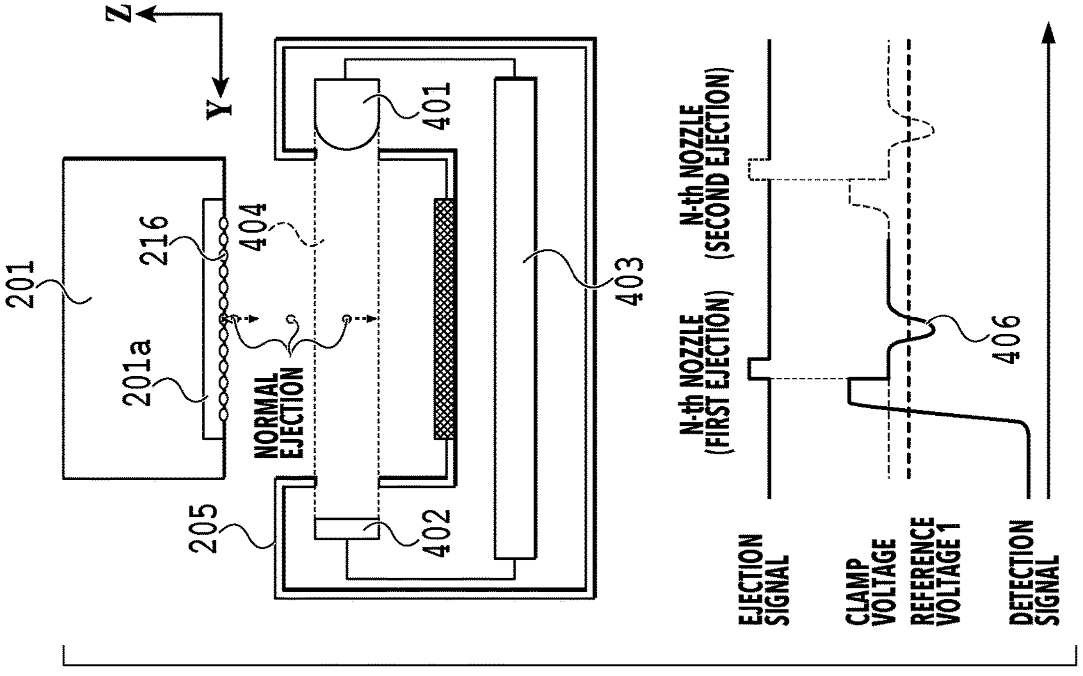
FIGS. 4A and 4B are schematic views and diagrams for explaining a method of detecting an ejection state of an ink droplet.
Figure 4B:
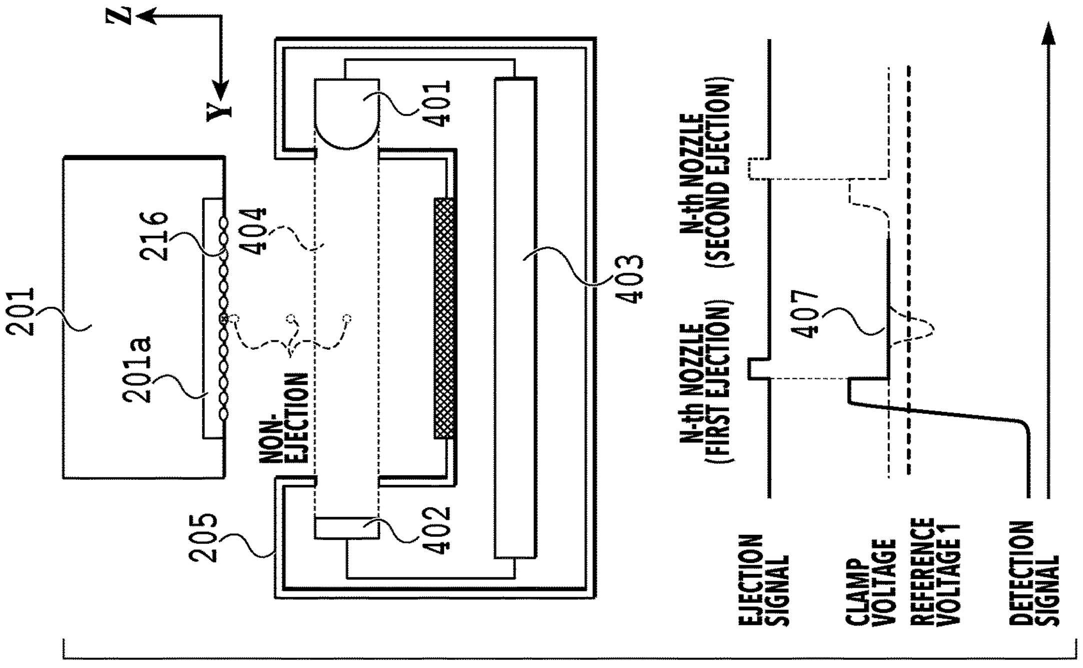

The print head 201 includes a distance detection sensor 204 configured to detect a distance between the print head 201 and the print medium 203 on the platen 212. The distance detection sensor 204 is an optical sensor which includes a light emitting element configured to emit light onto the print medium 203 and a light receiving element configured to receive the light reflected from the print medium 203, and which is configured to measure the distance based on a change in output of the amount of light received by the light receiving element. A droplet detection sensor 205 is an optical sensor configured to detect a droplet (an ink droplet herein) ejected from the print head. The droplet detection sensor 205 includes a light emitting element 401 (FIGS. 4A and 4B), a light receiving element 402 (FIGS. 4A and 4B), and a control circuit board 403 (FIGS. 4A and 4B). The droplet detection sensor 205 will be described later by using FIGS. 4A and 4B.

A main rail 206 is configured to support the carriage 202. The carriage 202 scans along the main rail 206 from left to right and back again in an X direction (a direction orthogonal to the transport direction of the print medium). The scanning of the carriage 202 is achieved by driving a carriage motor 208 and moving a carriage transport belt 207. A linear scale 209 is provided along the scanning direction in which the carriage 202 scans, and an encoder sensor 210 mounted on the carriage 202 obtains positional information by detecting the linear scale 209. In addition, the printing apparatus 100 includes a lift cam (not illustrated) configured to change stepwise the height of the main rail 206 supporting the carriage 202, and a lift motor 211 configured to drive the lift cam. With the lift motor 211 driven to move the lift cam, the print head 201 can be raised and lowered and accordingly the distance between the print head 201 and the print medium 203 can be shortened or widened.

The print head 201 has an ejection port surface (so-called a face surface) 201*a* in which ejection ports are formed, and is provided therein with (1) heaters configured to generate energy for ejecting liquids such as inks and (2) members for forming the ejection ports. In the ejection port surface 201*a*, a common liquid chamber 214 is provided for each ink color, the ink is supplied through ink channels 215 to multiple arrayed ejection ports 216, and is ejected from the ejection ports 216 by pressure generated with driving of the heaters, so that an image can be formed. Multiple ejection ports 216 are arrayed in a Y direction to form an ejection port array for each ink color. A plurality of such ejection port arrays are aligned in the X direction. Each of the ejection port arrays thus aligned includes 2048 nozzles, which are arranged not in a simple single row layout but in a zigzag nozzle layout. For this reason, each ejection port array is divided into two, that is, an ejection port row 217 having odd-numbered ejection ports and an ejection port row 218 having even-numbered ejection ports, where the ejection ports in the nozzle array is sequentially numbered from one end. Here, the odd-numbered ejection port row is referred to as the "odd-numbered nozzle row" and the even-numbered ejection port row is referred to as the "even-numbered nozzle row". Accordingly, each of the odd-numbered nozzle row and the even-numbered nozzle row is composed of 1024 nozzles, and a distance between the two nozzle rows is about 0.6 mm. A printing resolution of 1200 dpi (dots per inch) is achieved by a combination of the two nozzle rows, that is, the odd-numbered nozzle row and the even-numbered nozzle row in each nozzle array and a nozzle pitch in each of the odd-numbered nozzle row and the even-numbered nozzle row is 600 dpi. Then, droplet volumes of ink droplets ejected from the ejection port surface 201*a* of the print head 201 are mainly about 4 pl to 6 pl.

Figure 3:
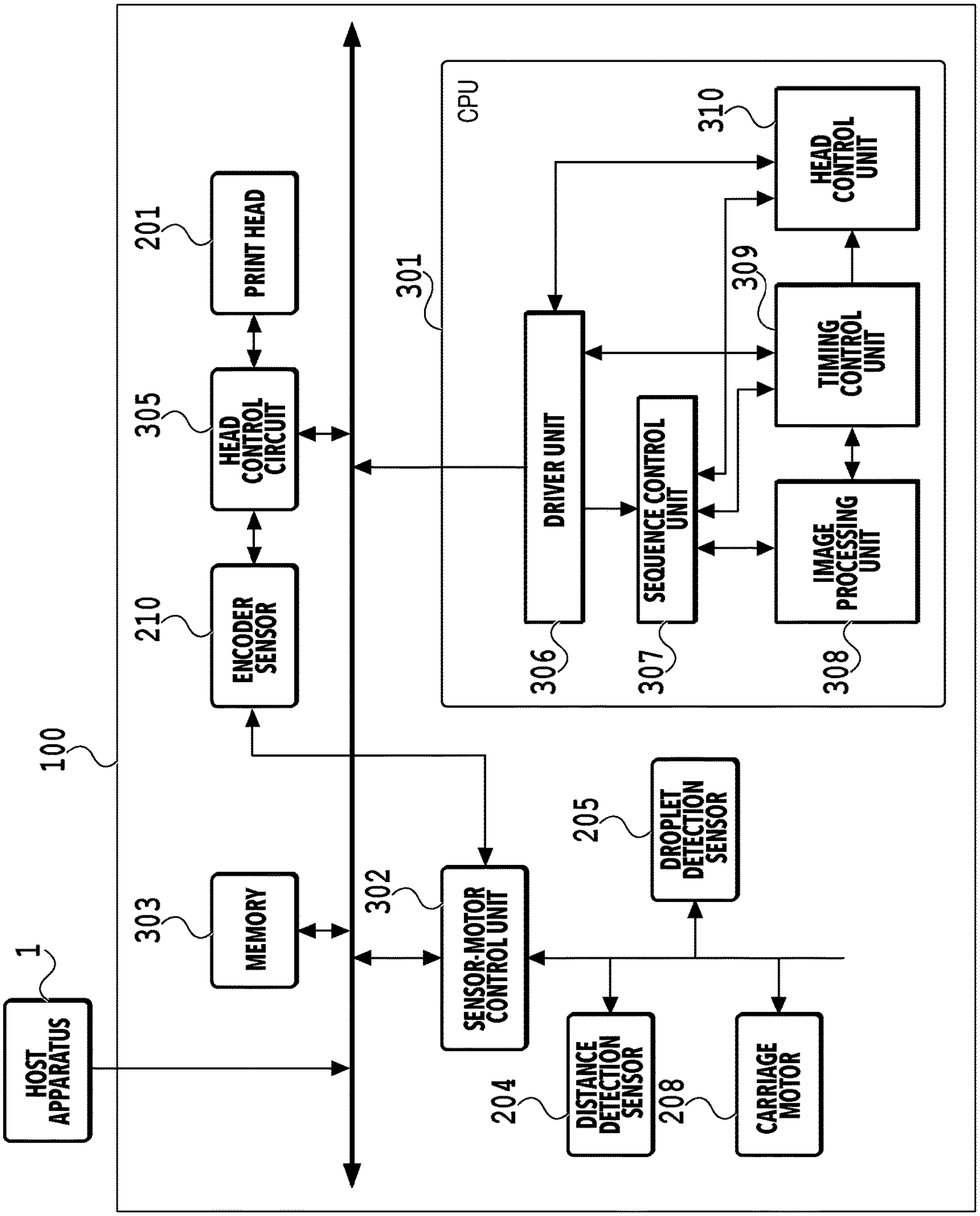
FIG. 3 is a block diagram illustrating a control configuration of the printing apparatus.

FIG. 3 is a block diagram illustrating a control configuration of the printing apparatus 100. The printing apparatus 100 includes a CPU 301 configured to control the entire apparatus, a sensor-motor control unit 302 configured to control the sensors and motor, and a memory 303 configured to store various kinds of information such as ejection states and thicknesses of print media. The CPU 301, the sensor-motor control unit 302, and the memory 303 are connected in a manner capable of communicating with each other. The sensor-motor control unit 302 controls the distance detection sensor 204, the droplet detection sensor 205, and the carriage motor 208 configured to cause the carriage 202 to scan. The sensor-motor control unit 302 controls a head control circuit 305 based on the positional information detected by the encoder sensor 210, and thereby causes the print head 201 to eject the inks.

The CPU 301 converts image data transmitted from a host apparatus 1 into ejection signals and the print head 201 ejects the inks according to the ejection signals to perform printing on the print medium 203. The CPU 301 includes a driver unit 306, a sequence control unit 307, an image processing unit 308, a timing control unit 309, and a head control unit 310. The sequence control unit 307 controls overall printing control, and more specifically starts and stops the functional blocks, namely, the image processing unit 308, the timing control unit 309, and the head control unit 310, and performs transport control of printing media, scanning control of the carriage 202, and so on. The sequence control unit 307 performs the control of the functional blocks included in the CPU 301 by reading various kinds of programs from the memory 303 and executing them. The driver unit 306 functions as an I/O control unit configured to control input and output. For example, the driver unit 306 generates control signals for the sensor-motor control unit 302, the memory 303, the head control circuit 305, and so on based on instructions from the sequence control unit 307 and transmits input signals from these blocks to the sequence control unit 307.

The image processing unit 308 performs image processing including performing color separation of image data input from the host apparatus 1 and converting the data obtained by the color separation into print data printable by the print head 201. According to the position of the carriage 202, the timing control unit 309 transfers, to the head control unit 310, the print data generated by the conversion in the image processing unit 308. The timing control unit 309 also controls a signal which is synchronous with an ejection from each nozzle and which is for use to determine the ejection state of a droplet. The head control unit 310 functions as a generation unit configured to generate ejection signals, converts the print data input from the timing control unit 309 into ejection signals, and outputs the ejection signals. The head control unit 310 controls the temperature of the print head 201 by outputting control signals to the extent that the ink will not be ejected based on an instruction from the sequence control unit 307. The head control circuit 305 functions as a generation unit configured to generate driving pulses, and generates a driving pulse and applies it to the print head 201 according to an ejection signal input from the head control unit 310.

<Method of Detecting Ejection State of Ink Droplet>

Next, a method of detecting an ejection state of an ink droplet ejected from the print head 201 will be described by using FIGS. 4A and 4B. Each of the upper-side views in FIGS. 4A and 4B is a schematic view of the print head 201 and the droplet detection sensor 205 where the printing apparatus 100 is taken along a Y-Z cross section. As illustrated in FIGS. 4A and 4B, the ejection port surface 201*a* of the print head 201 has ejection ports (also called nozzles) 216 for ejecting ink droplets of each ink color for image formation.

Each of the lower-side diagrams in FIGS. 4A and 4B is a timing chart of an ejection signal for applying driving pulses to the print head 201 and a signal that the droplet detection sensor 205 detects as detecting the passage of ink droplets ejected from the ejection port 216. As illustrated in FIGS. 4A and 4B, the print head 201 has the ejection port surface 201*a*. The droplet detection sensor 205 includes the light emitting element 401, the light receiving element 402, the control circuit board 403, and the like. The light emitting element 401 emits a light beam 404, whereas the light receiving element 402 receives the light beam 404 emitted by the light emitting element 401. The control circuit board 403 detects an amount of light received by the light receiving element 402. The control circuit board 403 is provided thereon with a current/voltage conversion circuit configured to convert a current flowing depending on the amount of light received by the light receiving element 402 into a voltage signal and output the voltage signal, and an amplification circuit for amplifying the level of a detection signal of an ink droplet. The control circuit board 403 is further provided with a clamp circuit for holding the level of the signal output from the amplification circuit at a predetermined value (clamp voltage) until immediately before ejection observation in order to eliminate influences of a fluctuation in the level of the detection signal responding to ejection of an ink droplet due to a disturbance, the influences including output saturation and deterioration of the S/N ratio. With these circuits, a desired level of the detection signal responding to ejection is ensured in order to detect a minute change such as ejection of an ink droplet. As a result, at a moment when an ink droplet passes through the light beam 404 in the droplet detection sensor 205, the amount of light received by the light receiving element 402 changes and the ejection state of a nozzle to be inspected is determined based on a result of comparison between the level of the output detection signal and a predetermined reference voltage. In the present specification, a "target nozzle" is defined as a nozzle to be inspected and "neighboring nozzles" are defined as nozzles arranged near the target nozzle.

The droplet detection sensor 205 is installed such that the light axis of the light beam 404 is located at the same position in the z direction as the surface of the platen 212 on a side for supporting the print medium 203. The droplet detection sensor 205 has slits provided near the light emitting element 401 and the light receiving element 402, respectively, and configured to narrow the incident light beam 404 and improve the S/N ratio. A position in the X direction where the print head 201 can eject ink droplets such that the ink droplets will pass through the light beam 404 is referred to as a "detection-enabling position". In order to detect ink droplets for detection of the ejection states of the ink droplets, the sensor-motor control unit 302 controls the carriage motor 208 in accordance with an instruction from the sequence control unit 307 to move the print head 201 to the detection-enabling position. The cross-sectional area of the light beam 404 in the present embodiment is about 2 mm×2 mm. Then, the parallel projection area of the ink droplet at a moment when the ink droplet passes through the light beam 404 is about 2^−3 (mm^2). The ejection port array and the light beam 404 are arranged in parallel to each other and their creepage distance in the height direction (Z direction) is 2 to 10 mm. In the case where each ejection port and the light beam 404 are close to each other in terms of the creepage distance, the ejection state can be detected stably because passage of an ink droplet can be detected with the light beam 404 arranged at a position close to the ejection position with respect to the flight distance of the ejected ink droplet. However, due to the proximity of the ejection port array and the light beam 404, the ejection port surface 201*a* of the print head 201 reflects a diffused light component emitted from the light emitting element 401, and thereby generates a light amount component to be received by the light receiving element 402. As a result, there is a possibility that the above light amount component as a noise component in the detection of the ejection state will be superimposed on the detection signal and disable good detection. Therefore, it is desirable to detect the ejection state under the condition where the light beam 404 of the droplet detection sensor 205 and the ejection port array of the print head 201 are arranged at a creepage distance more suitably set in consideration of the above correlation. The light beam 404 in the droplet detection sensor 205 and the platen 212 configured to support the print medium 203 are desirably arranged at substantially the same height (Z direction). The reason for this is to make the conditions for detecting the ejection states of ink droplets by the droplet detection sensor 205 suited to the ejection states of ink droplets to the print medium 203 during image formation.

Next, a configuration for detecting the ejection state of an ink droplet ejected and non-ejection will be described in detail. The lower-side diagram in FIG. 4A is a graph presenting a detection result in the case where an inspection target ejection port 216 (referred to as "N-th nozzle" herein) to be inspected by the droplet detection sensor 205 to detect the ejection state of the print head 201 can normally eject in the upper-side structure illustrated in FIG. 4A. Based on an ejection signal output by the head control unit 310 and the head control circuit 305, an ink droplet is ejected to the droplet detection sensor 205. According to the control signal synchronous with the ejection of the ink droplet, the aforementioned clamp circuit is operated to hold the level of the output signal at a predetermined clamp voltage value immediately before observation of the ejection of the ink droplet.

The ejection of an ink droplet is started and the operation of the clamp circuit is released immediately before the ink droplet ejected toward the light beam 404 blocks the light. Then, whether the ejection state is normal or not is determined based on the amount of light changed at a light blocking moment when the ink droplet blocks the light beam 404. In more details, the ejection state is determined as normal by detecting that the detection signal (signal output) falls below a predetermined reference voltage value (reference sign 406) due to a drop in the amount of light that occurs when the ejected ink droplet passes through the light beam 404 in the droplet detection sensor 205. Here, the ejection from the N-th nozzle to be inspected is determined as normal. FIG. 4A presents a result from multiple ejections (first and second ejections) from the N-th nozzle to be inspected in order to obtain a highly-reliable result as the ejection state detection result by the droplet detection sensor 205.

The lower-side diagram in FIG. 4B is a graph presenting a detection result in the case where the aforementioned N-th nozzle to be inspected to detect the ejection state of the print head 201 cannot eject normally, or in short, where the N-th nozzle is in a non-ejection state as illustrated on the upper-side view in FIG. 4B. As similar to FIG. 4A, an ink droplet is ejected to the droplet detection sensor 205 based on an ejection signal output by the head control unit 310 and the head control circuit 305. In the example in FIG. 4B, however, the ink droplet fails to be ejected properly and does not fly to the light beam 404. As a result, the ink droplet cannot block the light beam 404 and a drop in the amount of light, which might occur if the ejection were properly performed, cannot be obtained (reference sign 407). Therefore, the signal output does not fall below the reference voltage value, so that the ejection state cannot be detected. Accordingly, the N-th nozzle to be inspected is determined as being in a non-ejection state where an ink droplet cannot be ejected normally.

Next, using FIGS. 5A to 5C, description will be given of a correlation between an ejection velocity and a flight distance of an ink droplet ejected from each of the ejection ports 216 arrayed in the ejection port surface 201*a* in the print head 201. In the graphs presented in FIGS. 5A to 5C, a vertical axis indicates an ejection velocity of an ink droplet ejected and a horizontal axis indicates a flight discharge of the ink droplet ejected in the same manner. In the case where the force of gravity and the air resistance force are applied to an ink droplet ejected vertically downward from the print head 201 in a stopped state, the ejection velocity gradually decreases to finally reach a constant velocity, so that the motion of the ink droplet asymptotically approaches to uniform linear motion. A result of an experiment by the present inventor revealed that in a case of an ink droplet with a very small mass, at a moment when the gravitational acceleration and the air resistance force are evenly balanced, the ejected ink droplet loses almost all the velocity, 0 m/s, and is floated or stagnated by slight air currents flowing around the ink droplet.

Figure 5A:
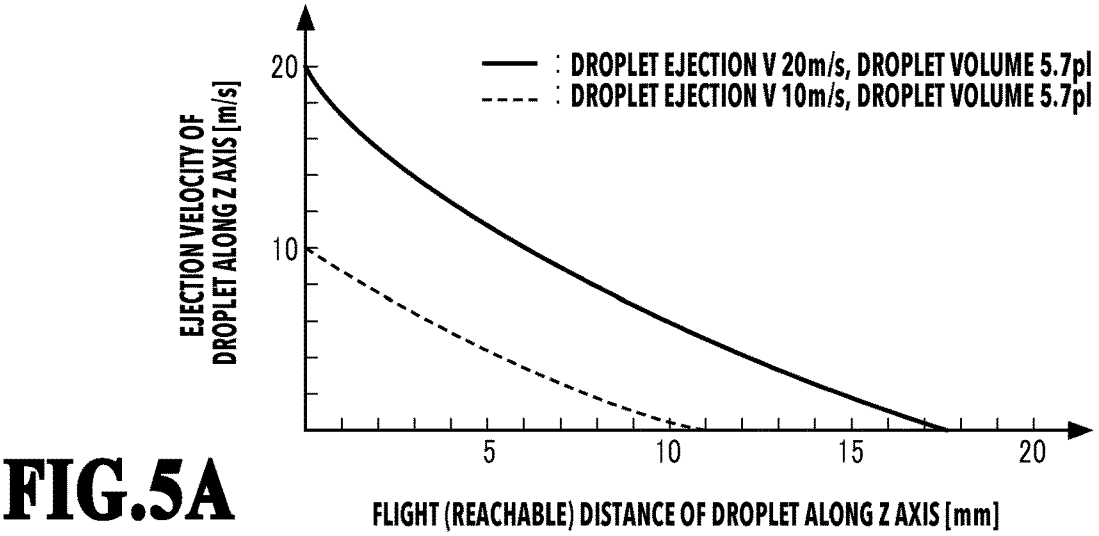
FIGS. 5A to 5C are diagrams illustrating a correlation between an ejection velocity and a flight distance of ink droplets.

FIG. 5A presents a behavior of the velocity of an ink droplet in a droplet volume of 5.7 pl attenuating from an ejection initial velocity in each of cases where the ink droplet is ejected at the initial velocity of 20 m/s and 10 m/s. As presented in FIG. 5A, in the case of the droplet volume of 5.7 p, the ink droplet loses a velocity component and stagnates when the flight distance of an ink droplet ejected reaches about 17.4 mm or 10.7 mm.

Figure 5B:
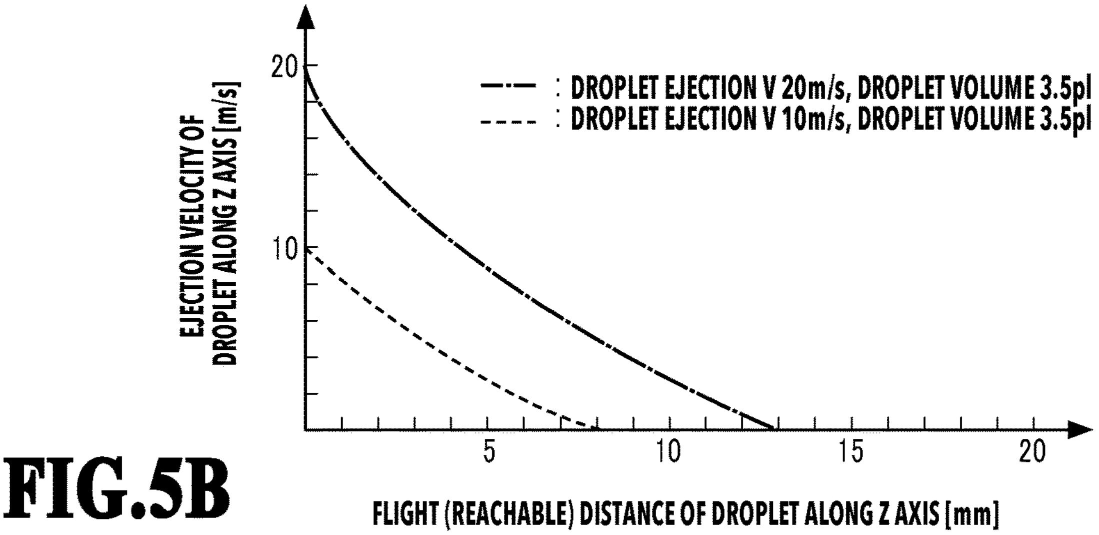
Figure 5C:
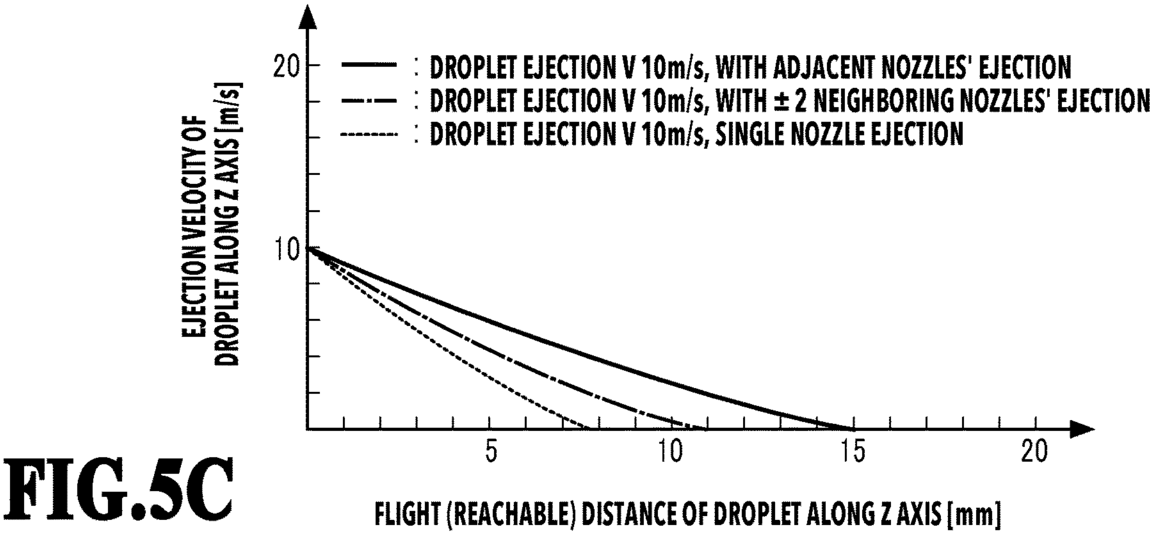

In contrast, FIG. 5B presents a behavior of the velocity of an ink droplet in a droplet volume of 3.5 pl attenuating from an ejection initial velocity in each of cases where the ink droplet is ejected at the initial velocity of 20 m/s and 10 m/s. As presented in FIG. 5B, in the case of the droplet volume of 3.5 p, the ink droplet loses a velocity component and stagnates when the flight distance of an ink droplet ejected reaches about 13.2 mm or 7.9 mm.

From the results presented in FIGS. 5A and 5B, it is seen that the flight distance of an ink droplet changes depending on the ejection initial velocity in ejection from the print head 201 irrespective of the droplet volume of the ink droplet. In addition, it is also seen that the distance reachable by the ink droplet, in other words, the flight distance varies depending on the droplet volume of the ink droplet ejected.

Meanwhile, a result of an experiment by the present inventor reveled that the flight distance of an ink droplet in a print head which ejects ink droplets at a low velocity is changed by almost simultaneously performing both of control of ejection from an inspection target nozzle and control of ejection from nozzles arranged near the target nozzle. FIG. 5C presents, as an example of the above result, changes in the flight distance of an ink droplet ejected with a droplet volume of 3.5 pl in comparison. As presented by a dashed line in FIG. 5C, the flight distance of an ink droplet ejected is 7.9 mm in the case where the ejection control was performed on the inspection target nozzle alone as in FIG. 5B. In contrast, as presented by a solid line in FIG. 5C, the flight distance of an ink droplet ejected is 14.9 mm in the case where the ejection control was performed by using not only the inspection target nozzle but also the nozzles arranged near the target nozzle (here, the adjacent nozzles). In addition, as presented by a dashed-dotted line in FIG. 5C, the flight distance of an ink droplet ejected is 12.4 mm in the case where not the adjacent nozzles but the nozzles separated by one nozzle from the target nozzle were used. In the case of the aforementioned print head 201 including the nozzle rows each achieving the print resolution of 600 dpi, the control of ejection from the neighboring nozzles including the adjacent nozzles or the nozzles separated by one nozzle from the target nozzle is performed together with the control of ejection from the inspection target nozzle. This makes it possible to increase the flight distance of an ink droplet ejected and stabilize the ejection state of the ink droplet. In the control of ejection of ink droplets from multiple nozzles for the purpose of forming an image by the printing apparatus 100, since a large amount of ink droplets are ejected, there is little influence as disturbances in the ink droplets landed on the print medium 203. However, in the control of ejection of ink droplets for each nozzle for the purpose of detecting the ejection state in particular, the stabilization of the ejection state is important.

Figure 6A:
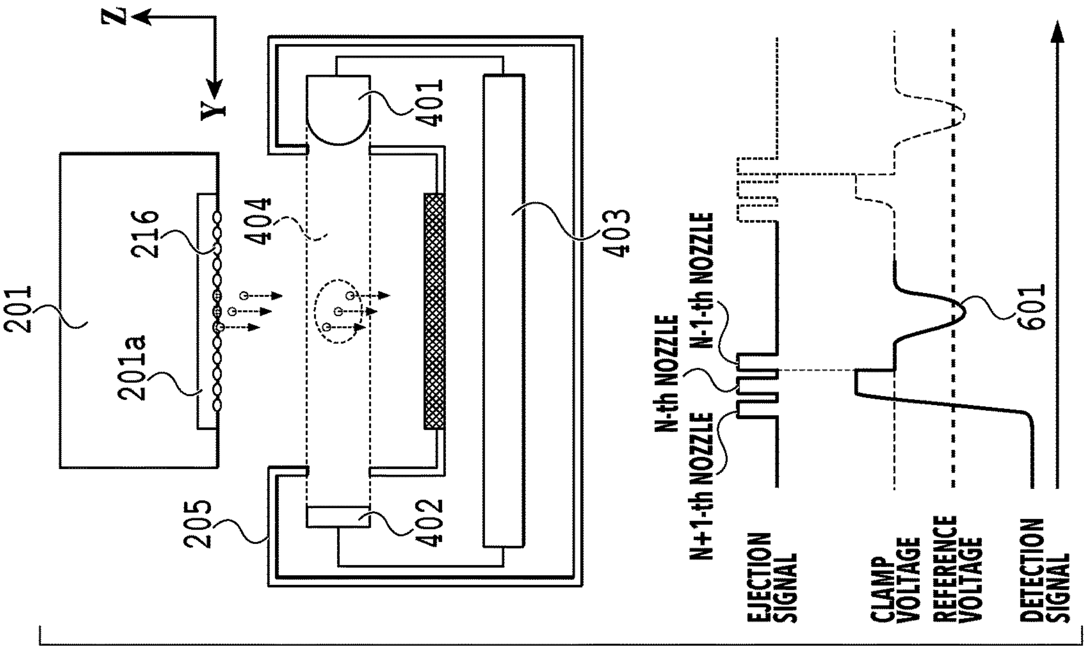
FIGS. 6A and 6B are views and diagrams for explaining a method of detecting an ejection state.
Figure 6B:
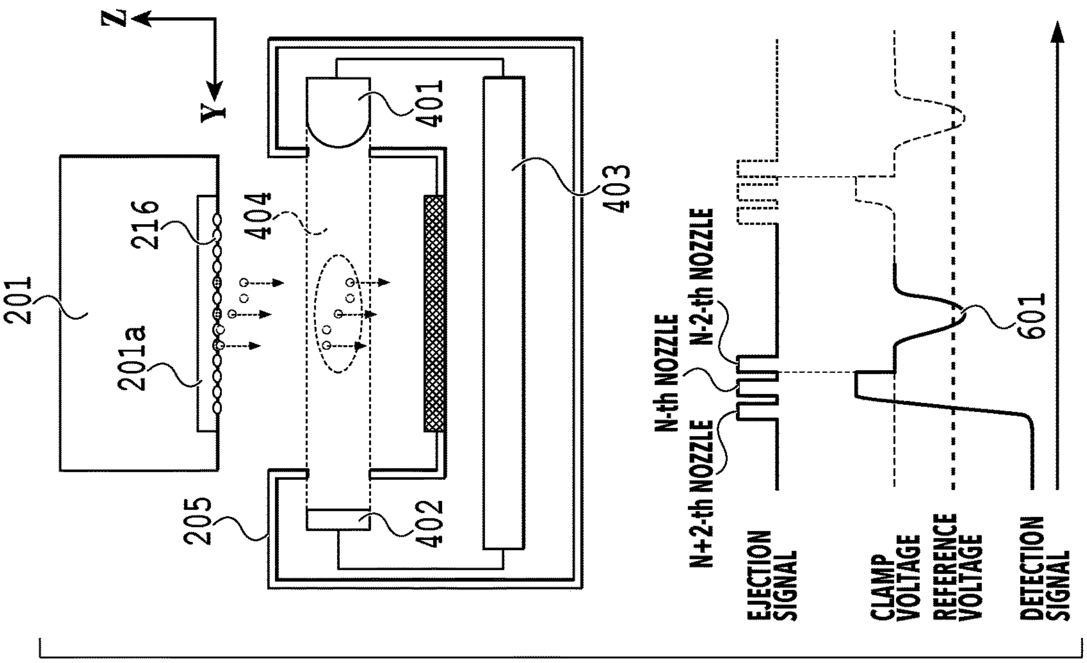

Next, by using FIGS. 6A and 6B, description will be given of a method of detecting an ejection state of an ink droplet ejected from the print head 201 in the present embodiment. As similar to the foregoing drawings in FIGS. 4A and 4B, each of the upper-side views in FIGS. 6A and 6B is a schematic view of the print head 201 and the droplet detection sensor 205 where the printing apparatus 100 is taken along the Y-Z cross section. Each of the lower-side diagrams in FIGS. 6A and 6B is a timing chart of an ejection signal for applying driving pulses to the print head 201 and a signal that the droplet detection sensor 205 detects as detecting the passage of ink droplets ejected from the ejection port 216. In the present embodiment, as an ejection control method for multiple nozzles including a nozzle to be inspected to detect the ejection state and nozzles arranged near the above nozzle, a control method including ejecting ink by driving the multiple nozzle successively will be introduced. Using this control method, the light beam 404 is blocked in the droplet detection sensor 205.

There is known time division control in which the nozzles included in the print head 201 are divided by a certain number into groups, and the divided nozzles are successively driven dividedly on a nozzle-by-nozzle basis. For example, in printing, the groups each successively perform ejection under time division control such that data located at the same position in the X direction in image data is printed within one pixel. The nozzles in each group start to eject ink droplets at timings with predetermined time intervals. Therefore, the time intervals can be generated between the timings at which the ejected ink droplets reach and block the light beam 404 in the droplet detection sensor 205, and drops in the amount of light that occur when the ink droplets pass through the light beam 404 are cumulatively added along with the time intervals. As a result, the ejection of the ink droplet can be detected with a time lag from a control signal synchronous with the ejection. In the present embodiment, driving nozzles such that ink droplets therefrom may simultaneously pass through the light beam 404 is referred to as simultaneous driving.

Hereinafter, a configuration for detecting the ejection state of an ink droplet ejected and ejection/non-ejection will be described in detail by using FIGS. 6A and 6B.

FIG. 6A presents, as a result of detection of the ejection state of an N-th nozzle to be inspected to detect the ejection state by using ejection control in which the nozzles adjacent to the N-th nozzle, in particular, are caused to eject ink among the nozzles arranged near N-th nozzle, a detection result in the case where the N-th nozzle can normally eject. In the upper-side view in FIG. 6A, the print head 201 corresponding to the graphs in FIGS. 5A to 5C is used.

As illustrated in FIG. 6A, the print head 201 ejects ink droplets to the droplet detection sensor 205 based on an ejection signal output by the head control unit 310 and the head control circuit 305. The ejection control is performed so as to cause the nozzles adjacent to the N-th nozzle, namely, the N−1-th nozzle and the N+1-th nozzle to eject ink droplets. According to a control signal synchronous with the ejection of the ink droplets, the output signal level is held at a predetermined clamp voltage value immediately before the ejection of the ink droplets is observed. The ejection of the ink droplets is started and the clamp operation is released immediately before the ink droplets ejected toward the light beam 404 block the light.

As a result, a change in the detection signal occurs due to a drop in the amount of light that occurs when the ink droplet ejected from the N+1-th nozzle starts to pass through the light beam 404 in the droplet detection sensor 205. Then, a further change in the detection signal occurs due to addition of a drop in the amount of light that occurs when the ink droplet ejected from the N-th nozzle to be inspected at a predetermined time interval from the ejection of the N+1-th nozzle passes through the light beam 404 in the same manner, and the change amounts of the changes thus occurred are cumulatively added. Moreover, a further change in the detection signal occurs due to addition of a drop in the amount of light that occurs when the ink droplet ejected from the N−1-th nozzle passes through the light beam 404 in the same manner, and the change amounts of the changes thus occurred are cumulatively added. As a result, the ejection state is determined as normal by detecting that the value of the detection signal falls below the predetermined reference voltage value (reference sign 601). As similar to the result presented in FIG. 4A, the ejection from the N-th nozzle is determined as normal herein.

On the other hand, FIG. 6B presents, as a result of detection of the ejection state of the N-th nozzle to be inspected by using ejection control in which the nozzles separated by one nozzle from the N-th nozzle are caused to eject ink among the nozzles arranged near the N-th nozzle, a detection result in the case where the N-th nozzle can normally eject. The print head 201 ejects ink droplets to the droplet detection sensor 205 based on an ejection signal output by the head control unit 310 and the head control circuit 305. The ejection control of the N−2-th nozzle and the N+2-th nozzle separated by one nozzle from the N-th nozzle to be inspected is performed. According to the control signal synchronous with the ejection of the ink droplets, the output signal level is held at the predetermined clamp voltage value immediately before the ejection of the ink droplets is observed. The ejection of the ink droplets is started and the clamp operation is released immediately before the ink droplets ejected toward the light beam 404 block the light.

As a result, a change in the detection signal occurs due to a drop in the amount of light that occurs when the ink droplet ejected from the N+2-th nozzle starts to pass through the light beam 404 in the droplet detection sensor 205. Then, a further change in the detection signal occurs due to addition of a drop in the amount of light that occurs when the ink droplet ejected from the N-th nozzle to be inspected at a predetermined time interval from the ejection of the N+2-th nozzle passes through the light beam 404 in the same manner, and the change amounts of the changes thus occurred are cumulatively added. Moreover, a further change in the detection signal occurs due to addition of a drop in the amount of light that occurs when the ink droplet ejected from the N−2-th nozzle passes through the light beam 404 in the same manner, and the change amounts of the changes thus occurred are cumulatively added. As a result, the ejection state of the N-th nozzle is determined as normal by detecting that the value of the detection signal falls below the predetermined reference voltage value.

Figure 7:
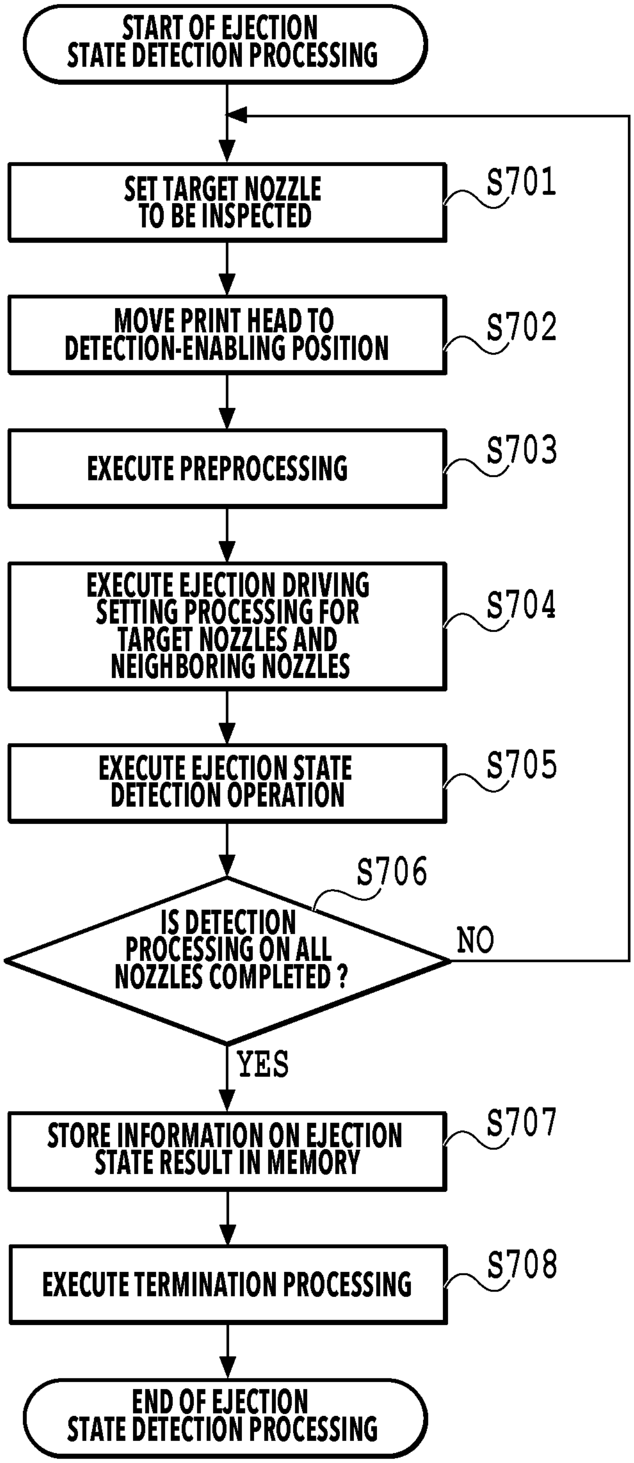
FIG. 7 is flowchart of processing of detecting an ejection state.

FIG. 7 is a flowchart of control for ejection state detection processing corresponding to FIGS. 6A and 6B according to the present embodiment. The processing in FIG. 7 is performed, for example, during an operation for initial installation in the case where the user operates the printing apparatus 100 for the first time, or when the print head 201 is replaced with a new one, specifically, immediately after a new print head 201 is mounted. In addition, the processing in FIG. 7 may be also performed periodically as maintenance after the user uses the printing apparatus 100 for a certain period of time, or may be performed directly according to a user's instruction. The processing in FIG. 7 is processing executed by the sequence control unit 307 in the CPU 301 in accordance with a program stored in, for example, the memory 303.

First, in step S701, the sequence control unit 307 sets a target nozzle to be inspected. The processing in this step is processing of setting a nozzle of interest in order to inspect the ejection states of all the nozzles of the print head 201. Hereinafter, "step S" will be abbreviated as "S".

In S702, the sequence control unit 307 drives the print head 201 and the carriage 202 by driving the carriage motor 208 to move the print head 201 to the detection-enabling position where the print head 201 can eject ink droplets detectable by the droplet detection sensor 205.

In S703, the sequence control unit 307 executes preprocessing necessary for detecting the ejection states. In detail, the preprocessing includes presetting of optimum ejection control for detecting the ejection states, a preliminary ejection operation for stable ejections of ink droplets, a suction fan stop operation for stabilizing air current control inside the printing apparatus, and so on.

In S704, the sequence control unit 307 executes ejection driving setting processing to enable some of the nozzles to perform ejection in order that the print head 201 will eject ink droplets for inspection. Some of the nozzles mentioned herein include the target nozzle to be inspected and neighboring nozzles near the target nozzle. More specifically, in this step, the ejection driving setting processing for the target nozzle for detecting the ejection state and the neighboring nozzles arranged near the target nozzle is performed such that the neighboring nozzles can also perform ejection in order to stabilize the ejection state of an ink droplet from the target nozzle and further increase the flight distance of the ink droplet.

In S705, the sequence control unit 307 executes an operation of ejecting ink droplets for inspection from the print head 201 to the light beam 404 (referred to as an ejection state detection operation) based on the settings in S704. This operation includes processing of causing the target nozzle to start to eject an ink droplet, causing the light receiving element 402 in the droplet detection sensor 205 to receive the light, and obtaining the detection signal which indicates whether the ink droplet passed through the light beam 404.

In S705, a reference voltage for use to detect the ejection state is also set based on the number of nozzles to be used according to the ejection driving settings for the multiple nozzles set in S704. The ejection state of the target nozzle is detected by comparing the reference voltage and the detection signal (values) and determining their magnitude relationship. From the viewpoint of stabilization of the ejection state of the ink droplet, it is desirable to use a large number of neighboring nozzles for detecting the ejection state of the target nozzle.

In S706, the sequence control unit 307 determines whether the detection of the ejection states of all the nozzles included in the print head 201 is completed or not. If the determination result in this step is Yes, the processing proceeds to S707. On the other hand, if the determination result in this step is No, the processing is returned to S701.

In S707, the sequence control unit 307 stores information specifying the ejection states of all the nozzles included in the print head 201 in the memory 303. The information on the ejection states stored in this step is afterward subjected to data processing as needed and then is used in the driving control of the print head 201.

In S708, the sequence control unit 307 performs termination processing. In detail, since the detection of the ejection states is completed, the sequence control unit 307 retreats the print head 201 to a predetermined position, is transitioned to the standby status for the next print operation, or is transitioned to cleaning processing of the print head 201 based on the obtained information on the ejection states. After the termination processing in this step, a series of the ejection state detection processing is ended.

Effects of Present Embodiment

As described above, in the present embodiment, in the detection of the ejection states of ink droplets from the print head 201, the ejection control of one or more neighboring nozzles arranged near the target nozzle is also performed together with the ejection control of the target nozzle. Then, the detection signal indicating the ejection result from the target nozzle and the neighboring nozzles is obtained by using the droplet detection sensor 205, and the ejection state of the target nozzle is determined based on the obtained detection signal. Thus, even if the ejection velocity of ink droplets ejected from the print head 201 is low, it is possible to stabilize the flight states of the ink droplets ejected and improve the detection accuracy of the ejection states of the ink droplets.

Second Embodiment

In the first embodiment, multiple nozzles including the target nozzle are driven to eject ink sequentially on the nozzle-by-nozzle basis for detecting the ejection state of the target nozzle. In the case where the multiple nozzles are driven to eject ink sequentially on the nozzle-by-nozzle basis as described above, it is possible to prevent a drop in a driving voltage applied at one time to the heater element provided for each nozzle and thereby suppress a peak current, as compared with the case where all the nozzles are simultaneously driven to eject ink. However, since the nozzles driven to eject ink sequentially on the nozzle-by-nozzle basis, there is a concern that an inspection time for inspecting all the nozzles may be long. To address this, in the present embodiment, control of driving the target nozzle to eject ink is performed and concurrently control of driving neighboring nozzles to eject the ink at the same time as the target nozzle is performed. This makes it possible to shorten the inspection time.

Figure 8B:
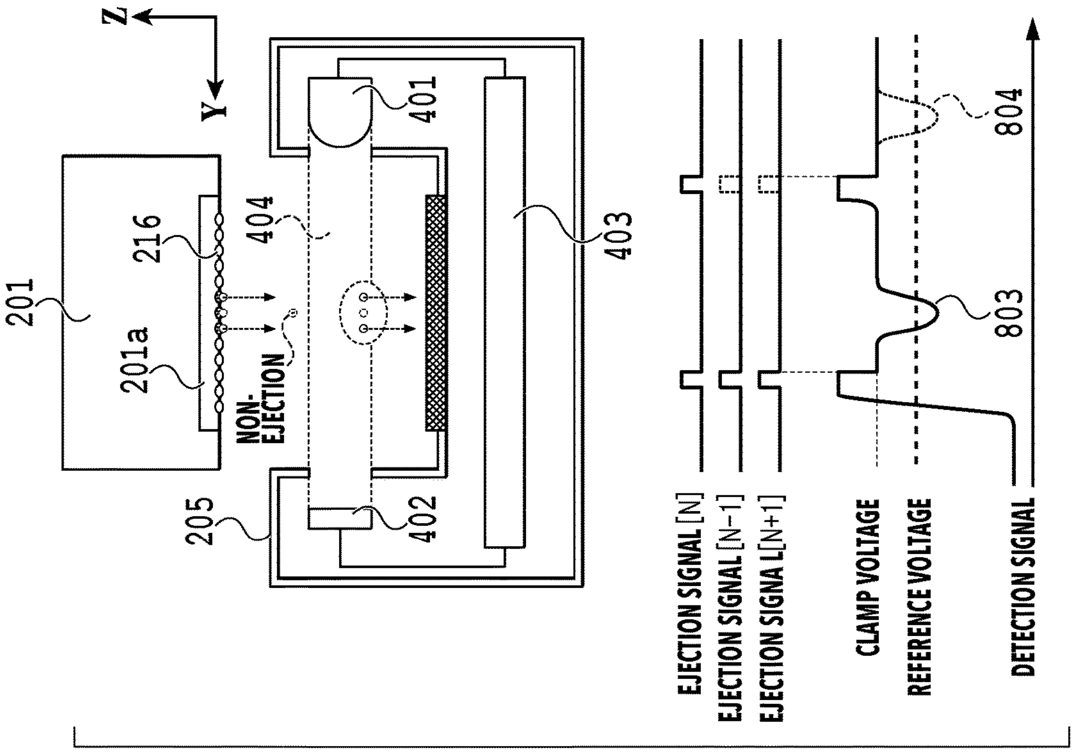
FIGS. 8A and 8B are views and diagrams for explaining a method of detecting an ejection state.
Figure 8A:
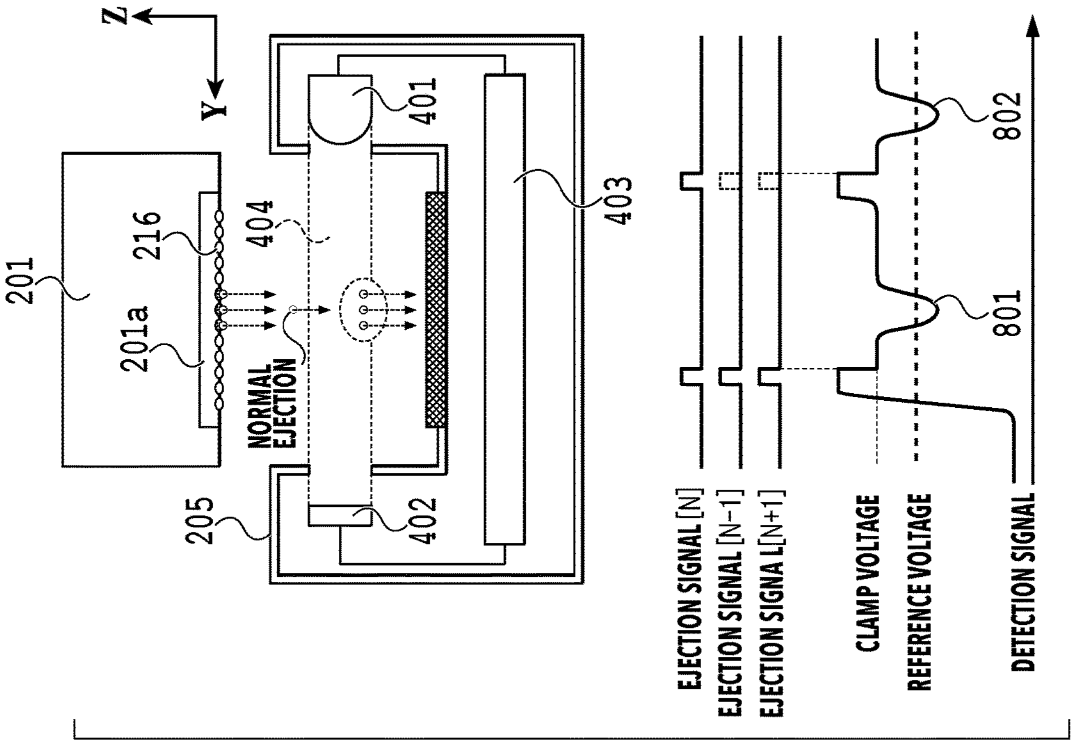

Next, by using FIGS. 8A and 8B, description will be given of a method of detecting the ejection states of ink droplets ejected from the print head 201 in the present embodiment. As similar to the foregoing drawings in FIGS. 4A and 4B and FIGS. 6A and 6B, each of the upper-side views in FIGS. 8A and 8B is a schematic view of the print head 201 and the droplet detection sensor 205 where the printing apparatus 100 is taken along the Y-Z cross section. Each of the lower-side diagrams in FIGS. 8A and 8B is a timing chart of ejection signals for applying driving pulses to the print head 201 and a signal that the droplet detection sensor 205 detects as detecting the passage of ink droplets ejected from the ejection port 216. In the present embodiment, as an ejection control method for neighboring nozzles being other than the nozzle to be inspected to detect the ejection state and arranged near the above nozzle, control of simultaneously driving the nozzle to be inspected and the neighboring nozzles to eject ink droplets simultaneously is performed, and the ink droplets block the light beam 404 in the droplet detection sensor 205. Moreover, immediately after the ink droplets are ejected simultaneously from the nozzle to be inspected and the neighboring nozzles, control of driving the nozzle to be inspected alone to eject an ink droplet is performed, and the ink droplet blocks the light beam 404 in the droplet detection sensor 205 in the same manner.

As described in the first embodiment, it was revealed that the flight distance of an ink droplet is changed by simultaneously controlling ejection from the target nozzle to be inspected and ejection from neighboring nozzles near the target nozzle. In addition, in the case where the target nozzle alone is driven to eject an ink droplet immediately after the target nozzle and the neighboring nozzles are controlled and driven to eject ink droplets simultaneously, the ejection state of the ink droplet ejected by the subsequent single driving is stable and the flight distance of the ink droplet is changed. This is due to influence of air currents caused by the ink droplets ejected by the preceding simultaneous driving. For the aforementioned reason, the control of simultaneously driving multiple nozzles including the target nozzle and its neighboring nozzles to eject ink and the control of driving the target nozzle alone to eject the ink are iterated a predetermined number of times to obtain the ejection state of the target nozzle.

FIG. 8A presents a detection result in the case where the N-th nozzle to be inspected to detect the ejection state can normally eject. The print head 201 ejects ink droplets to the droplet detection sensor 205 based on ejection signals output by the head control unit 310 and the head control circuit 305. As presented in FIG. 8A, the control on the target nozzle to eject an ink droplet and the control on the neighboring nozzles near the target nozzle to eject ink droplets are performed concurrently. As a result of this, the ink droplet is ejected from the target nozzle simultaneously with the ink droplets ejected from the neighboring nozzles, and flies to the light beam 404 in the droplet detection sensor 205. No time interval occurs between the ink droplets simultaneously ejected, and all the ink droplets almost simultaneously reach and block the light beam 404. For this reason, a change in the amount of light received by the light receiving element 402 in the droplet detection sensor 205 is equivalent to a change caused by an ink droplet from a single nozzle. Therefore, if at least one of the multiple neighboring nozzles normally ejects an ink droplet, the amount of a drop in the amount of light does not vary irrespective of the ejection state of the target nozzle. After the control of simultaneously driving the target nozzle and the neighboring nozzles to eject the ink droplets is performed, the target nozzle alone is driven to eject an ink droplet to the light beam 404 in the droplet detection sensor 205 based on the ejection signal in the same manner as in the foregoing simultaneous driving. Then, the ejection state of the target nozzle is determined based on whether or not the signal output falls below the predetermined reference voltage value due to each of the drops in the amount of light that occur when the ink droplets block the light beam 404 in the droplet detection sensor 205. In detail, it is determined whether or not the output signal falls below the reference voltage value due to each of the drop in the amount of light caused by the ejection with the simultaneous driving of the target nozzle and the neighboring nozzles in the preceding stage (reference sign 801) and the drop in the amount of light caused by the ejection with the single driving of the target nozzle in the subsequent stage (reference sign 802). If the output signal falls below the reference voltage value in both the preceding stage and the subsequent stage, the target nozzle is determined to be in a normal state where normal ejection is possible.

FIG. 8B presents a detection result in the case where the N-th nozzle to be inspected cannot normally eject, in other words, is in a non-ejection state unlike FIG. 8A. As similar to FIG. 8A, the print head 201 ejects ink droplets to the droplet detection sensor 205 based on ejection signals output by the head control unit 310 and the head control circuit 305. In FIG. 8B, however, the target nozzle cannot eject an ink droplet normally and no ink droplet flies to the light beam 404.

In the preceding stage, the control on the target nozzle to eject an ink droplet and the control on the neighboring nozzles near the target nozzle to eject ink droplets are performed simultaneously as illustrated in FIG. 8B. As a result of this, theoretically, the ink droplet is ejected from the target nozzle simultaneously with the ink droplets ejected from the neighboring nozzles, and flies to the light beam 404 in the droplet detection sensor 205. No time interval occurs between the ink droplets simultaneously ejected, and all the ink droplets almost simultaneously reach and block the light beam 404. For this reason, a change in the amount of light received by the light receiving element 402 in the droplet detection sensor 205 is equivalent to a change caused by an ink droplet from a single nozzle. Therefore, if at least one of the multiple neighboring nozzles normally ejects an ink droplet, the amount of a drop in the amount of light does not vary irrespective of the ejection state of the target nozzle.

In the subsequent stage, the control on the target nozzle alone to eject an ink droplet is performed. In this stage, the target nozzle attempts to eject an ink droplet based on the ejection signal but the target nozzle is in the non-ejection state. Therefore, the target nozzle cannot eject any ink droplet, the light beam 404 in the droplet detection sensor 205 cannot be blocked, a drop in the amount of light, which might occur if the ink droplet were properly ejected, does not occur, and consequently the output signal does not fall below the reference voltage value as illustrated in FIG. 8B.

In the above case in FIG. 8B, unlike FIG. 8A, the target nozzle is determined as being in a non-ejection state in which normal ejection is impossible because the output signal falls below the reference voltage value in the preceding stage (reference sign 803) but does not fall below the reference voltage value in the subsequent stage (reference sign 804).

Figure 9:
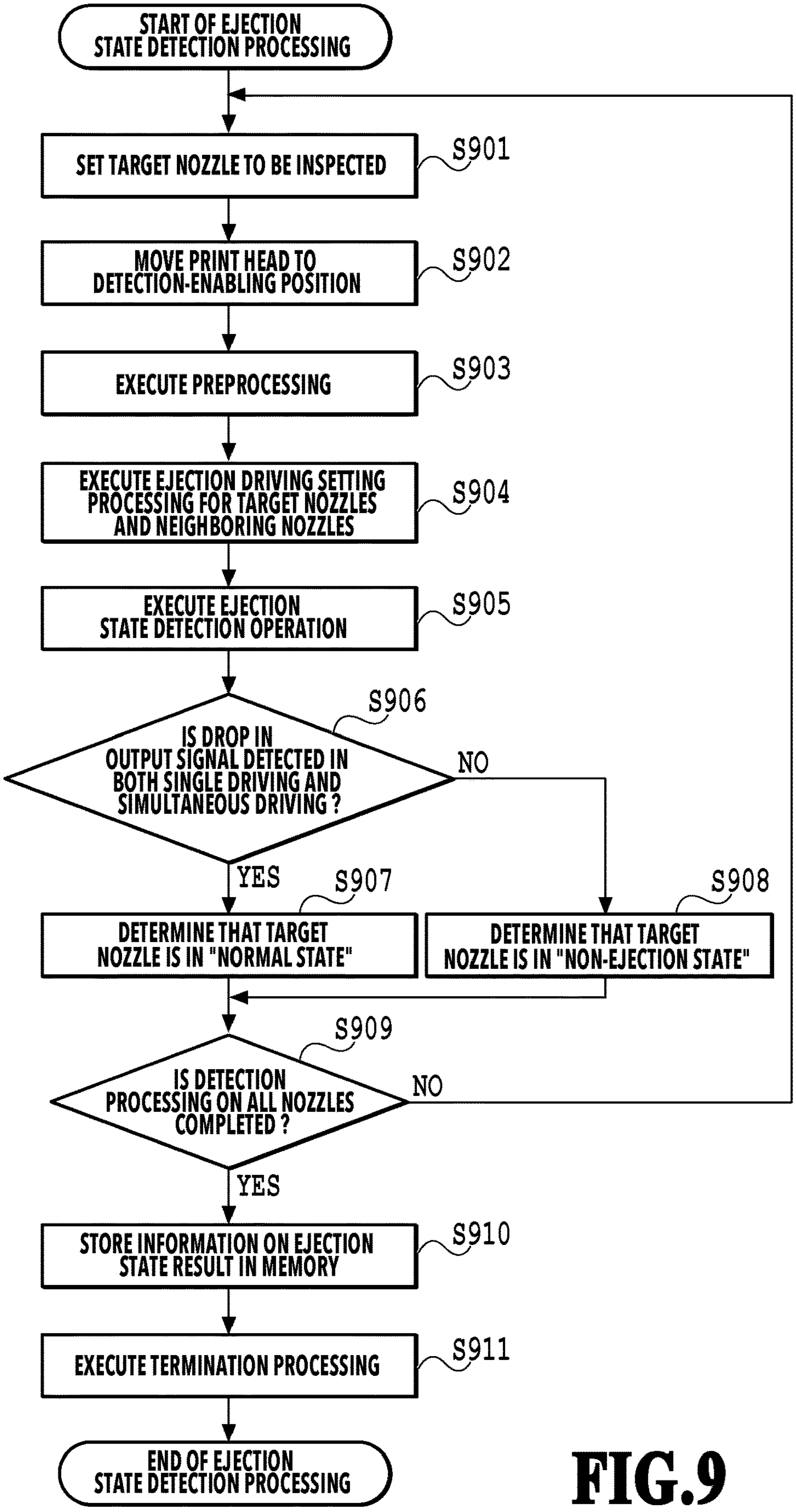
FIG. 9 is a flowchart of processing of detecting an ejection state.

FIG. 9 is a flowchart of control for ejection state detection processing corresponding to FIGS. 8A and 8B according to the present embodiment. The processing in FIG. 9 is performed, for example, during an operation for initial installation in the case where the user operates the printing apparatus 100 for the first time, or when the print head 201 is replaced with a new one, specifically, immediately after a new print head 201 is mounted. In addition, the processing in FIG. 9 may be also performed periodically as maintenance after the user uses the printing apparatus 100 for a certain period of time, or may be performed directly according to a user's instruction. The processing in FIG. 9 is processing executed by the sequence control unit 307 in the CPU 301 in accordance with a program stored in, for example, the memory 303.

First, in S901, the sequence control unit 307 sets a target nozzle to be inspected. The processing in this step is processing of setting a nozzle of interest in order to inspect the ejection states of all the nozzles of the print head 201.

In S902, the sequence control unit 307 drives the print head 201 and the carriage 202 by driving the carriage motor 208 to move the print head 201 to the detection-enabling position where the print head 201 can eject ink droplets detectable by the droplet detection sensor 205.

In S903, the sequence control unit 307 executes preprocessing necessary for detecting the ejection states. In detail, the preprocessing includes presetting of optimum ejection control for detecting the ejection states, a preliminary ejection operation for stable ejections of ink droplets, a suction fan stop operation for stabilizing air current control inside the printing apparatus, and so on.

In S904, the sequence control unit 307 executes ejection driving setting processing to enable some of the nozzles to perform ejection in order that the print head 201 will eject ink droplets for inspection. In detail, the ejection driving setting processing is performed for neighboring nozzles near the target nozzle in order to stabilize the ejection state of an ink droplet from the target nozzle and further increase the flight distance of the ink droplet. In the present embodiment, the settings are made such that the target nozzle alone will be driven to eject ink after the control of driving the target nozzle to eject ink and the simultaneous driving control of driving the neighboring nozzles to eject ink at the same time are performed concurrently.

In S905, the sequence control unit 307 executes an operation of ejecting ink droplets for inspection from the print head 201 to the light beam 404 (referred to as an ejection state detection operation) based on the settings in S904. This operation includes processing of causing the target nozzle to start to eject an ink droplet, causing the light receiving element 402 in the droplet detection sensor 205 to receive the light, and obtaining the detection signal which indicates whether the ink droplet passed through the light beam 404.

In S905, a reference voltage for use to detect the ejection state is also set based on the number of nozzles to be used according to the ejection driving settings for the multiple nozzles set in S904. The ejection state of the target nozzle is detected by comparing the reference voltage and the detection signal (values) and determining their magnitude relationship. From the viewpoint of stabilization of the ejection state of the ink droplet, it is desirable to use a large number of neighboring nozzles for detecting the ejection state of the target nozzle.

A method of determining the ejection state of the target nozzle to be inspected is also set by the ejection driving settings of the multiple nozzles set in S904. As described using FIGS. 8A and 8B, the target nozzle is driven to eject ink, and at the same time, the neighboring nozzles arranged near this target nozzle are also driven. After the simultaneous ink ejection from the target nozzle and the neighboring nozzles, the detection signal and the reference voltage are compared to determine their magnitude relationship. Immediately after that, the target nozzle alone is driven to eject ink, and the detection signal and the reference voltage are compared to determine their magnitude relationship. Then, whether a drop in the signal output below the reference voltage value is detected is determined in both the case of the simultaneous driving of the multiple nozzles including the target nozzle and the neighboring nozzles and the case of the single driving of the target nozzle. In the present embodiment, the above determination method is set as the method of determining the ejection state of the nozzle.

In S906, the sequence control unit 307 determines whether a drop in the detection signal of the target nozzle, that is, the signal output below the reference voltage value is detected in both the case of the simultaneous driving of the multiple nozzles including the target nozzle and the neighboring nozzles and the case of the single driving of the target nozzle. If the determination result in this step is Yes, the processing proceeds to S907. On the other hand, if the determination result in this step is No, the processing proceeds to S908.

In S908, the sequence control unit 307 determines that the target nozzle is in the normal state in which normal ejection is possible.

In S909, the sequence control unit 307 determines that the target nozzle is in the non-ejection state in which normal ejection is impossible.

In S909, the sequence control unit 307 determines whether the detection of the ejection states of all the nozzles included in the print head 201 is completed or not. If the determination result in this step is Yes, the processing proceeds to S910. On the other hand, if the determination result in this step is No, the processing is returned to S901.

In S910, the sequence control unit 307 stores information specifying the ejection states of all the nozzles included in the print head 201 in the memory 303. The information on the ejection states stored in this step is afterward subjected to data processing as needed and then is used in the driving control of the print head 201.

In S911, the sequence control unit 307 performs termination processing. In detail, since the detection of the ejection states is completed, the sequence control unit 307 retreats the print head 201 to a predetermined position, is transitioned to the standby status for the next print operation, or is transitioned to cleaning processing of the print head 201 based on the obtained information on the ejection states. After the termination processing in this step, a series of the ejection state detection processing is ended.

Effects of Present Embodiment

As described above, in the present embodiment, in the detection of the ejection states of ink droplets from the print head 201, the ejection control of one or more neighboring nozzles arranged near the target nozzle to be inspected is also performed together with the ejection control of the target nozzle. Then, the detection signal indicating the ejection result from the target nozzle and the neighboring nozzles is obtained by using the droplet detection sensor 205, and the ejection state of the target nozzle is determined based on the obtained detection signal. Thus, even if the ejection velocity of ink droplets ejected from the print head 201 is low, it is possible to stabilize the flight states of the ink droplets ejected and improve the detection accuracy of the ejection states of the ink droplets.

Other Embodiments

In the foregoing embodiments, the mode where two nozzles are used as the neighboring nozzles driven in addition to the target nozzle in the inspection of the target nozzle is described. However, the number of nozzles usable as the neighboring nozzles is not limited to two. In detail, as the neighboring nozzles, two or more nozzles may be used or nozzles whose separation distances from the target nozzle are within a range of predetermined distance may be used.

In the case where at least one of neighboring nozzles whose separation distances from the target nozzle are within a range of predetermined distance is determined as having an ejection failure in the inspection of the target nozzle, the target nozzle may be driven at a frequency higher than a driving frequency in normal times (the case where the neighboring nozzles have no ejection failure). This makes it possible to improve the detection accuracy.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to maintain the detection accuracy of the ejection states of droplets such as ink droplets and prevent erroneous determination.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-092336, filed Jun. 7, 2022, which is hereby incorporated by reference herein in its entirety.

What is claimed is:

1. A printing apparatus comprising:

a print head including a plurality of nozzles configured to eject droplets onto a print medium;

a control unit configured to control driving of each of the plurality of nozzles to eject the droplets; and an inspection unit configured to inspect whether or not each of the plurality of nozzles is able to eject the droplets normally by driving the print head by the control unit, wherein in a case where the inspection unit inspects one target nozzle among the plurality of nozzles, the control unit drives the target nozzle and one or more neighboring nozzles arranged near the target nozzle such that (1) the control unit drives the target nozzle and the one or more neighboring nozzles simultaneously, and (2) after the simultaneous driving, the control unit drives the target nozzle alone.

2. The printing apparatus according to claim 1, wherein the control unit is capable of causing each of the plurality of nozzles to eject the droplet at a desired timing by using an ejection signal.

3. The printing apparatus according to claim 1, further comprising a sensor configured to detect the droplets ejected from the print head, wherein the inspection unit inspects whether or not each of the plurality of nozzles is able to eject the droplets normally by using a change in an output signal obtained by the sensor.

4. The printing apparatus according to claim 3, wherein the sensor includes (1) a light emitting element and (2) a light receiving element configured to receive a light beam emitted by the light emitting element, wherein the droplets ejected from the print head block the light beam, and wherein the output signal drops due to the light blocking.

5. The printing apparatus according to claim 1, wherein the target nozzle and the one or more neighboring nozzles are arrayed along a predetermined direction.

6. The printing apparatus according to claim 5, further comprising a transport unit configured to transport the print medium in a transport direction, wherein the predetermined direction is the transport direction.

7. The printing apparatus according to claim 1, wherein the control unit drives the target nozzle and the one or more neighboring nozzles sequentially on a nozzle-by-nozzle basis.

8. The printing apparatus according to claim 7, wherein the target nozzle and the one or more neighboring nozzles eject the droplets consecutively at a predetermined time interval.

9. The printing apparatus according to claim 8, wherein the one or more neighboring nozzles include a first neighboring nozzle and a second neighboring nozzle, wherein the first neighboring nozzle, the target nozzle, and the second neighboring nozzle are arranged in this order in the predetermined direction, and wherein the control unit drives the first neighboring nozzle, the target nozzle, and the second neighboring nozzle sequentially in this order.

10. The printing apparatus according to claim 9, wherein the first neighboring nozzle and the second neighboring nozzle are nozzles adjacent to the target nozzle.

11. The printing apparatus according to claim 9, wherein the first neighboring nozzle and the second neighboring nozzle are nozzles separated by one nozzle from the target nozzle.

12. The printing apparatus according to claim 7, wherein the one or more neighboring nozzles are at least two nozzles whose separation distances from the target nozzle are within a range of predetermined distance.

13. The printing apparatus according to claim 7, wherein in a case where at least one of the one or more neighboring nozzles is determined as having an ejection failure, the control unit drives the target nozzle at a higher frequency than a normal driving frequency.

14. The printing apparatus according to claim 6, further comprising a platen configured to support the print medium, wherein a height of the sensor is approximately equal to a height of the platen.

15. A method of controlling a printing apparatus, the printing apparatus including (1) a print head including a plurality of nozzles configured to eject droplets onto a print medium and (2) a control unit configured to control driving of each of the plurality of nozzles to eject the droplets, the method comprising:

an inspection step of inspecting whether or not each of the plurality of nozzles is able to eject the droplets normally by driving the print head by the control unit, wherein in a case where one target nozzle among the plurality of nozzles is inspected in the inspection step, the control unit drives the target nozzle and one or more neighboring nozzles arranged near the target nozzle such that (1) the control unit drives the target nozzle and the one or more neighboring nozzles simultaneously, and (2) after the simultaneous driving, the control unit drives the target nozzle alone.

16. The method according to claim 15, wherein the control unit drives the target nozzle and the one or more neighboring nozzles sequentially on a nozzle-by-nozzle basis.

17. The method according to claim 16, wherein the target nozzle and the one or more neighboring nozzles eject the droplets consecutively at a predetermined time interval.

18. The method according to claim 17, wherein the neighboring nozzles include a first neighboring nozzle and a second neighboring nozzle, wherein the first neighboring nozzle, the target nozzle, and the second neighboring nozzle are arranged in this order in the predetermined direction, and wherein the control unit drives the first neighboring nozzle, the target nozzle, and the second neighboring nozzle sequentially in this order.

19. A non-transitory computer-readable storage medium storing a program causing a computer to execute a method of controlling a printing apparatus, the printing apparatus including (1) a print head including a plurality of nozzles configured to eject droplets onto a print medium and (2) a control unit configured to control driving of each of the plurality of nozzles to eject the droplets, the method comprising:

an inspection step of inspecting whether or not each of the plurality of nozzles is able to eject the droplets normally by driving the print head by the control unit, wherein in a case where one target nozzle among the plurality of nozzles is inspected in the inspection step, the control unit drives the target nozzle and one or more neighboring nozzles arranged near the target nozzle such that (1) the control unit drives the target nozzle and the one or more neighboring nozzles simultaneously, and (2) after the simultaneous driving, the control unit drives the target nozzle alone.

* * * * *